No. 746,289. Patented December 8, 1903.

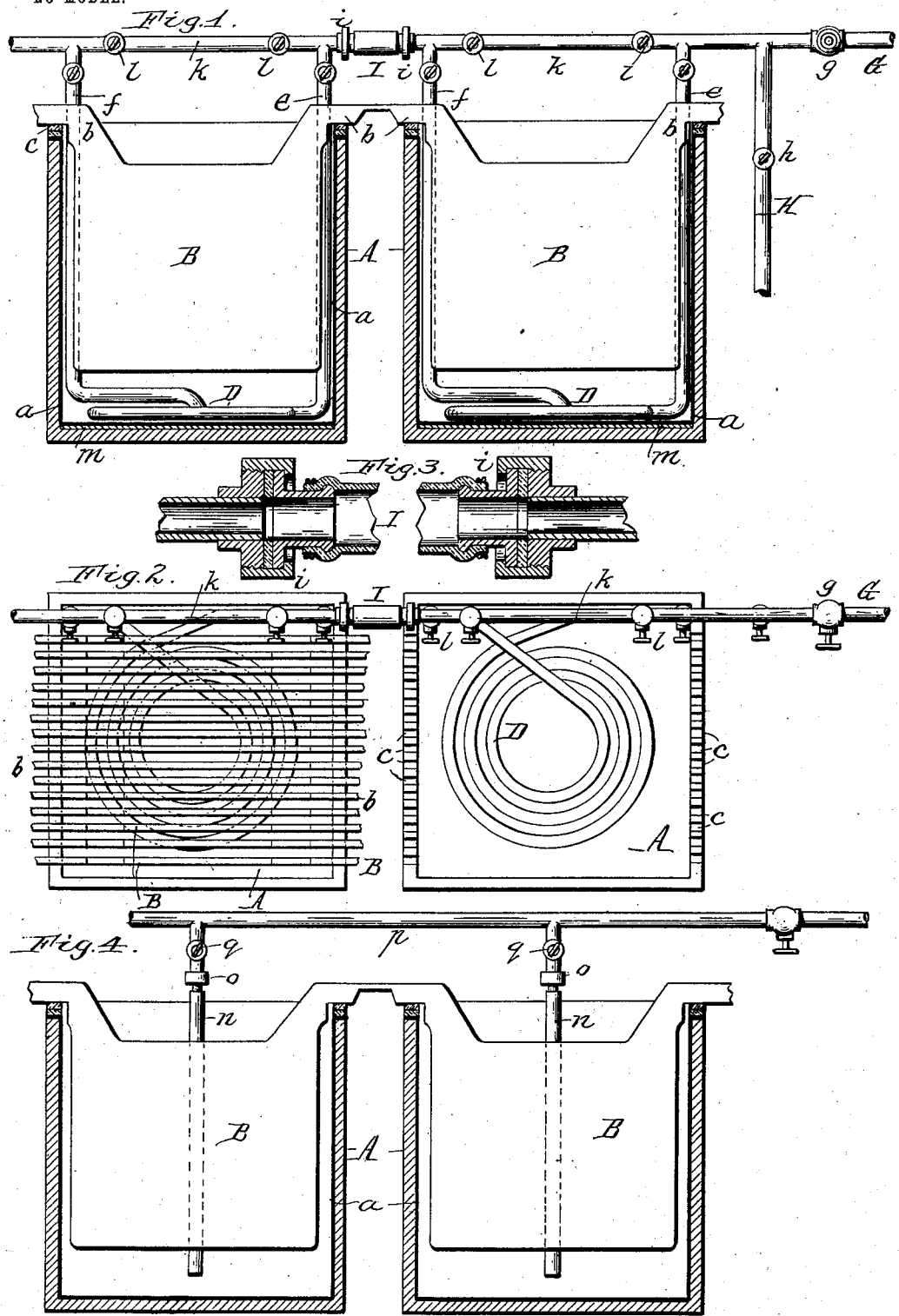

UNITED STATES PATENT OFFICE.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

STORAGE BATTERY.

SPECIFICATION forming part of Letters Patent No. 746,289, dated December 8, 1903.

Application filed May 13, 1901. Serial No. 59,905. (No model.)

*To all whom it may concern:*

Be it known that I, RUFUS N. CHAMBERLAIN, a citizen of the United States, residing at Depew, in the county of Erie and State of New York, have invented new and useful Improvements in Storage Batteries, of which the following is a specification.

This invention relates to means for regulating the temperature of storage batteries. Ordinarily the temperature of the electrolyte fluctuates in accordance with the temperature of the room in which the battery is placed. In cold weather the temperature is liable to be at times very low and in hot weather or in hot localities it is liable to be very high. A battery works usually most satisfactorily at a temperature of about 90° Fahrenheit. Under ordinary atmospheric conditions in the temperate zone the temperature of the electrolyte is about 60° Fahrenheit. At this temperature the capacity of the battery is much below what it would be if the temperature of the electrolyte were about 90° Fahrenheit. It is usually reckoned that the capacity of a battery varies about one per cent. for each degree of variation in temperature. For instance, if a battery gives six thousand ampere hours at 60° Fahrenheit it will give about nine thousand ampere hours at 90° Fahrenheit. On the other hand, if the temperature of the electrolyte rises much above 90° Fahrenheit a destructive disintegration of the electrodes is liable to take place. Such an excessively high temperature is liable to arise from a high temperature of the surrounding air or from an unusual high rate of discharge of the battery.

The object of my invention is to provide simple and efficient means for regulating the temperature of the electrolyte and element by heating it if it is too cold or cooling it if it is too hot.

In the accompanying drawings, Figure 1 is a sectional elevation of a pair of cells provided with one embodiment of my invention. Fig. 2 is a top plan view with the electrodes removed from one of the cells. Fig. 3 is a longitudinal section, on an enlarged scale, of the insulating-coupling connecting the regulating-coils of the cells. Fig. 4 is a sectional elevation of a pair of cells provided with another embodiment of my invention.

Like letters of reference refer to like parts in the several figures.

A represents the box or case of the cell, which may be of any suitable form or construction and which is so constructed and of such material that it prevents, as far as practicable, radiation of heat through the wall of the cell. An inexpensive and desirable construction consists of a four-sided wooden box provided with a lining $a$, of sheet-lead.

B represents the electrodes of ordinary construction arranged in the boxes A and connected in any suitable manner. As shown, the electrodes are supported by necks $b$ in notches $c$ in the upper sides of opposite walls of each box.

D represents a horizontal circulating-coil of pipe which is arranged in the lower portion of each box below the electrode for regulating the temperature of the electrolyte by means of a heating or cooling agent which is caused to flow through the coil. The latter is preferably made of lead pipe or other metal which will enable the coil to act as an efficient heating or cooling surface and will not be attacked by the acid of the electrolyte.

$e$ represents the inlet-pipe of each coil, which descends along one of the upright walls of the box A, and $f$ represents the outlet-pipe, which ascends along the opposite side of the box.

G and H represent two supply-pipes which are connected with the inlet-pipe $e$ of the first coil in the series for supplying a heating or cooling medium to the coils, as may be necessary. Steam is preferably used for heating and cold water for cooling. The pipes G H are respectively provided with stop-cocks $g$ $h$.

I represents an insulating tubular coupling or connection which is interposed between the outlet-pipe $f$ of one coil and the inlet-pipe $e$ of the next following coil for the purpose of allowing the heating or cooling medium to flow from one coil to the next without establishing a metallic connection between the coils. This insulating-coupling avoids the tendency of a local discharge or short circuit through the pipes. A convenient construction of this insulating-coupling consists of a tube of rubber, which is connected with the ends of the adjacent pipes by screw-couplings $i$.

As the different cells of a large battery often vary considerably in temperature, it is desirable to regulate the temperature of each cell separately. For that purpose each coil is provided with a by-pass pipe $k$, which connects the inlet-pipe $e$ with the outlet-pipe $f$ of the coil directly, and these pipes are provided with hand-valves $l$, so that the coil of any particular cell may be included in the circulation or cut out, as the temperature of the cell may require.

A layer $m$ of asbestos or other non-heat-conducting material is preferably arranged between the bottom of the lead lining and the bottom of the cell-casing for preventing the escape of heat downwardly from the steam-coil.

As the coil is arranged directly in the electrolyte, the latter is quickly and efficiently heated or cooled by the heating or cooling medium which flows through the coil, and as the cell-case is constructed of wood or other material which is a poor conductor of heat the electrolyte is thereby protected to a considerable extent against the cooling or heating influences of the surrounding air. The coil being arranged horizontally underneath the electrodes causes a lively circulation in the electrolyte, which prevents the stratifying of the latter.

In the embodiment of my invention represented in Fig. 4 the regulating medium is injected directly into the electrolyte instead of being circulated through a coil. For this purpose each cell is provided with a pipe $n$, which opens at its lower end near the bottom of the cell and which is connected at its upper end by a coupling $o$ with a supply-pipe $p$. Each injecting-pipe $n$ is provided with a hand-valve $q$. For heating the cell steam is injected into the electrolyte, and for cooling cold air is injected. The depending injecting-pipe is constructed of rubber or other non-conducting material, so that no metallic connection is established between the cells through the pipes.

By my invention the battery can be kept in a uniform or normal condition of efficiency under varying conditions of surroundings or atmosphere, and the battery is therefore required to be no larger than is necessary for service under normal conditions, while when the temperature of the electrolyte fluctuates greatly and drops very low in cold weather the battery must be much larger than necessary for service under normal conditions in order to enable the battery to give the required discharge when the temperature is very low. The temperature of the electrolyte can be raised above the normal in an emergency for giving an unusually high discharge for a short time—as, for instance, when an unusually high duty is required of a street-car plant at a certain time of day.

I do not wish to limit myself to the use of any specific heat-regulating medium nor to any specific construction of the coil through which such medium flows, as these features are capable of variation without departing from the spirit of my invention.

I claim as my invention—

1. The combination of a plurality of cell-casings, electrodes arranged therein, a flow-pipe for a heat-regulating medium extending into each cell-casing, and means whereby the flow-pipes of the several cells are insulated from each other, substantially as set forth.

2. The combination of a plurality of cell-casings, electrodes arranged therein, a flow-coil for a temperature-regulating medium arranged in each casing, and an insulating connection arranged between the outlet of one coil and the inlet of the next following coil, substantially as set forth.

3. The combination of a battery-cell, a flow-coil for a heat-regulating medium arranged in connection therewith, a by-pass connecting the inlet and outlet of the coil, and means for directing a heat-regulating medium through the coil or through the by-pass, substantially as set forth.

4. The combination of a battery-cell, a flow-pipe arranged in connection therewith, a connection for supplying a heating medium to said flow-pipe, a connection for supplying a cooling medium to said flow-pipe, and means for controlling said connections, substantially as set forth.

Witness my hand this 7th day of May, 1901.

RUFUS N. CHAMBERLAIN.

Witnesses:
 JNO. J. BONNER,
 C. M. BENTLEY.